Nov. 10, 1931.  W. J. BROWN  1,831,338
PROTECTIVE APPARATUS FOR ELECTRICAL SYSTEMS
Filed April 2, 1925   3 Sheets-Sheet 1
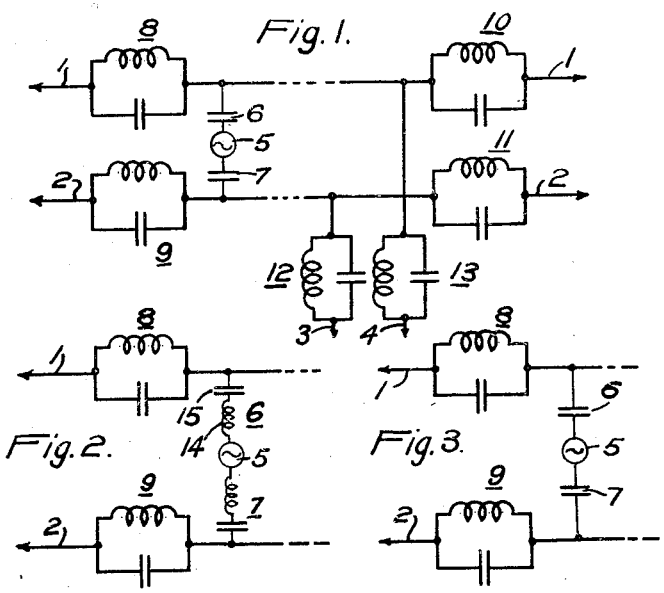
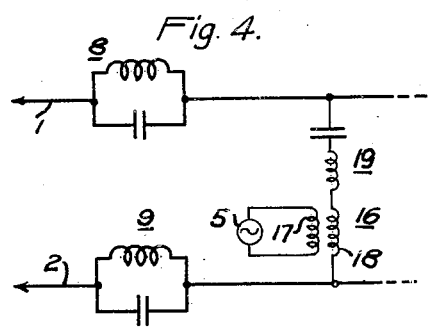
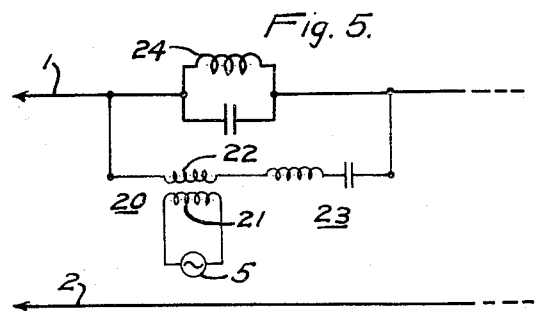
INVENTOR
Walter John Brown.
BY
ATTORNEY Nov. 10, 1931. W. J. BROWN 1,831,338
PROTECTIVE APPARATUS FOR ELECTRICAL SYSTEMS
Filed April 2, 1925 3 Sheets-Sheet 2
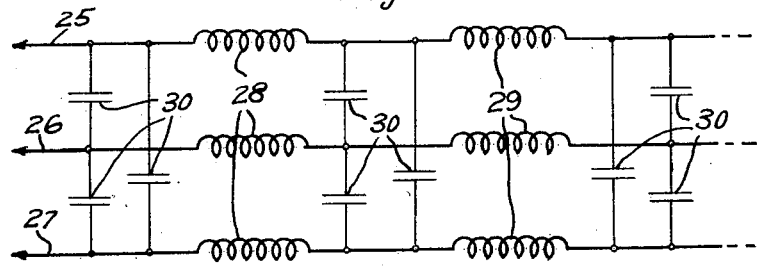
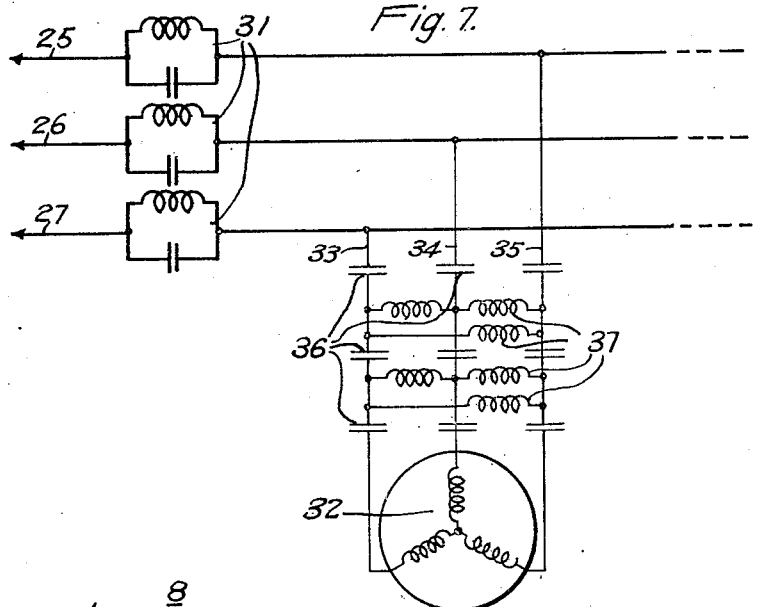
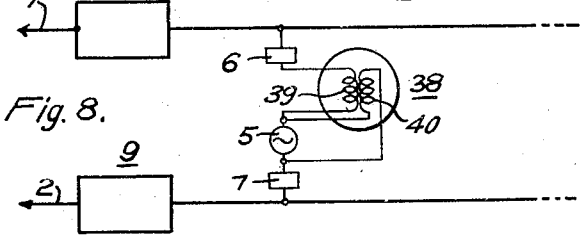
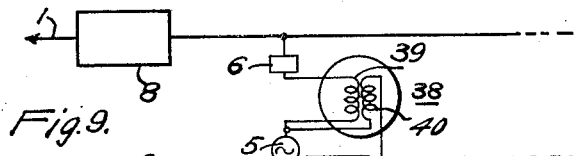
INVENTOR
Walter John Brown.
BY
ATTORNEY Patented Nov. 10, 1931

1,831,338

UNITED STATES PATENT OFFICE

WALTER JOHN BROWN, OF EVERSLEY, ENGLAND, ASSIGNOR TO ASSOCIATED ELECTRICAL INDUSTRIES LIMITED, A BRITISH COMPANY

PROTECTIVE APPARATUS FOR ELECTRICAL SYSTEMS

Application filed April 2, 1925, Serial No. 20,210, and in Great Britain April 17, 1924.

My invention relates to protective apparatus for electric power lines and systems and particularly to protective apparatus in which an alternating-current of frequency different from that of the line current is superimposed on the line to actuate relays or the like responsive only to this superimposed frequency.

The object of the invention is to selectively protect a desired section of the distribution system by the use of devices which have substantially infinite impedance to currents of the control frequency but which offer substantially no impedance to currents of other frequencies including the normal frequency.

According to my invention, the protective apparatus comprises electrical coupling circuits which offer a low impedance to the high-frequency relay-operating current which is fed through these circuits into the desired section of the line system; further electrical circuits substantially anti-resonant only to the relay-operating current which are arranged in the line system at the ends of the section to be protected; and relays arranged to be responsive only to the high-frequency current to operate on the occurrence of predetermined conditions.

The circuits which offer a low impedance to the high-frequency control current will be hereinafter referred to as acceptor circuits; and the circuits substantially resonant to the high-frequency current, that is to say having substantially infinite impedance for this current, will be hereinafter referred to as rejector circuits.

In carrying out the invention, it is preferable to use a control current of high frequency compared with the line frequency in order that small condensers and reactors may be used in the accepter and rejector circuits but a low frequency may be used if found desirable from other considerations. The rejector circuits preferably consist of condensers and reactors connected to form a parallel resonance circuit for the control frequency.

In order that the invention can be fully understood, it will be described with reference to the accompanying drawings in which;

Figs. 1 to 7 are diagrammatic views of electrical circuit arrangements by which the high-frequency control current can be fed into the line system and confined to a predetermined section thereof;

Figs. 8 and 9 are similar views of two arrangements for the connection of a protective relay in a single-phase system;

Figure 10:
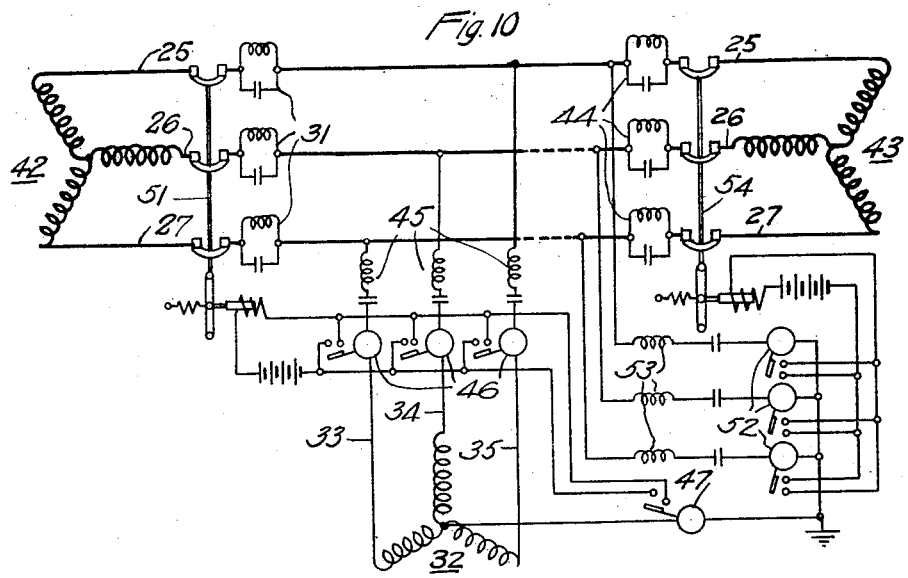
Figs. 10 and 11 are similar views of a three-phase system.

Referring to Fig. 1, the line conductors of a single-phase distribution system are shown at 1 and 2. The conductors 3 and 4 of a branch or feeder circuit are connected thereto. The protective or high-frequency generator 5 is connected to the line conductors through acceptor circuits 6 and 7 which are shown as comprising condensers. Rejector circuits 8 and 9 are provided in the line conductors 1 and 2 at one end of the section to be protected and similar rejector circuits 10 and 11 are provided at the other end of the said section. If it is not desired to protect the branch circuit with the protected section of the line, rejector circuits 12 and 13 are placed in the conductors 3 and 4. The rejector circuits comprise a reactor in parallel with a condenser, as shown. The inductance of the reactor is equal to the capacity of the condenser at the frequency of the generator 5 and therefore the rejector circuits afford a high impedance to the protective current and a low impedance to the relatively low frequency line current.

In Figs. 2 and 3, two forms of the acceptor circuits 6 and 7 are illustrated. In Fig. 2, the acceptor circuits comprise reactor 14 in series with a condenser 15. In Fig. 3, in which the protective current is of much higher frequency than that of the line current, the acceptor circuits may conveniently comprise condensers only. The magnitudes of the reactors and condensers forming the acceptor are adjusted so as to afford a low impedance to the protective current and a high impedance to the line current.

In Fig. 4, an arrangement is illustrated in which the high-frequency current is fed into the main system through a transformer 16, the primary winding 17 of which is connected across the generator 5 and the secondary winding 18 of which is connected in series with an acceptor circuit 19 across the line conductors 1 and 2.

In Fig. 5 is shown an alternative arrangement to that illustrated in Fig. 4. A transformer 20 is provided, the primary winding 21 of which is connected across the generator 5 as before and the secondary winding 22 is preferably connected in series with an acceptor circuit 23 in the line conductor 1. The rejector circuit 24 is preferably connected in parallel with the secondary winding 22 and the acceptor circuit 23 in order to shunt the line current to which the acceptor circuit 23 offers a high impedance. In this case, it is desirable that the high-frequency current should be fed into the line approximately at the mid-point of the section which it is desired to protect in order that the loads connected to each terminal of the transformer 20 may be approximately balanced.

In Fig. 6 the use of filter circuits in place of the simple rejector circuits is illustrated as applied to a three-phase system comprising the line conductors 25, 26 and 27. Inductances 28 and 29 are provided in each of the line conductors. Condensers 30 are connected across each pair of line conductors at each end of each inductance 28 and 29 as shown. A filter circuit system is thereby provided which can be adjusted to prevent frequencies above a predetermined value from passing out of the section which is to be protected.

In Fig. 7, the use of filter circuits is similarly illustrated as applied to a three-phase system having line conductors 25, 26 and 27 containing rejector circuits 31. Three-phase high-frequency generator 32 is connected to the line conductors 25, 26 and 27 through the conductors 33, 34 and 35 respectively. Condensers 36 are connected in series in each of the conductors 33, 34 and 35 and inductances 37 are connected across each pair of said conductors between each pair of corresponding series connected condensers 36 as shown.

In all of the arrangements described, the capacity and inductance of the protected section of the line, the acceptor circuits, the relays and the generator circuits may be adjusted so that said section is substantially resonant at the frequency of the relay-operating current. Therefore, the maximum high-frequency current flows in the protected section of the line for given voltage of the high-frequency generator.

It is evident that at high frequencies the capacity current flowing from the protective generator to the line will be of considerable magnitude and that consequently the occurrence of a fault may not appreciably increase the total current flowing from the protective generator. The relays employed in carrying out the invention may be so arranged as to overcome this difficulty. Thus as shown in Figs. 8 and 9, two such arrangements of a protective relay sensitive to the control current only are illustrated as applied to a single-phase system. The protective generator 5 is arranged to feed current into the line conductors 1 and 2 through the acceptor circuits 6 and 7. The protective relay is illustrated by 38 and is a power-operated or watt relay. The current coil 39 of the relay is connected in series with the generator 5 and one of the acceptor circuits and the voltage coil 40 is connected across the generator. The relay 38 may be adjusted to operate as soon as the power taken from the generator deviates from normal by a predetermined amount.

In Fig. 9 an alternative arrangement is illustrated in which the relay 38 may be a current or voltage relay and in which an auxiliary winding is provided the effect of which is opposed to that due to the main winding. The auxiliary winding 40 is connected across the generator 5 in series with an artificial circuit or dummy line 41 which comprises a suitable arrangement of condensers, inductances and resistances. The artificial circuit 41 is adjusted to take a current whose effect in the relay just neutralizes that of the normal line capacity current flowing through the main relay coil 39. The relay 38 can be adjusted to operate when the current through, or voltage across the main winding, deviates by a predetermined amount from normal.

In Fig. 10 is shown the connection of protective relays in a three-phase system. A three-phase high-frequency generator 32 is connected to the line conductors 25, 26 and 27 through the conductors 33, 34 and 35 respectively. The main source of current for the system and the load are indicated at 42 and 43. A suitable acceptor circuit 45 comprising an inductance and a condenser is provided in each of conductors 33, 34 and 35. The rejector circuits 31 and 44 each comprising an inductance in parallel with a condenser are connected at the ends of the section to the line which it is desired to protect. A current-operated relay 46 is connected in each of the conductors 33, 34 and 35, and a current-operated relay 47 is connected between the neutral point of the generator 32 and earth. The relays 46 are arranged to operate on the occurrence of a short-circuit between any of the line conductors 25, 26 and 27, and the relay 47 is arranged to operate if one of said line conductors is connected to earth.

The contacts of relays 46 and 47 are connected in parallel with the trip circuit of the circuit breaker 51 to effect the actuation thereof on the occurrence of any fault condition on the system. At the load end of the transmission system, voltage relays 52 are connected between each of the conductors 25, 26 and 27 and earth. A series resonant device or acceptor circuit 53, similar to the acceptor circuits 45, is serially-connected with each relay 52 for permitting the energization thereof only in accordance with the superposed high-frequency. The contacts of the relays 52 are connected in parallel with the trip circuit of the circuit breaker 54 to effect the actuation thereof on the occurrence of any fault condition on the system.

Figure 11:
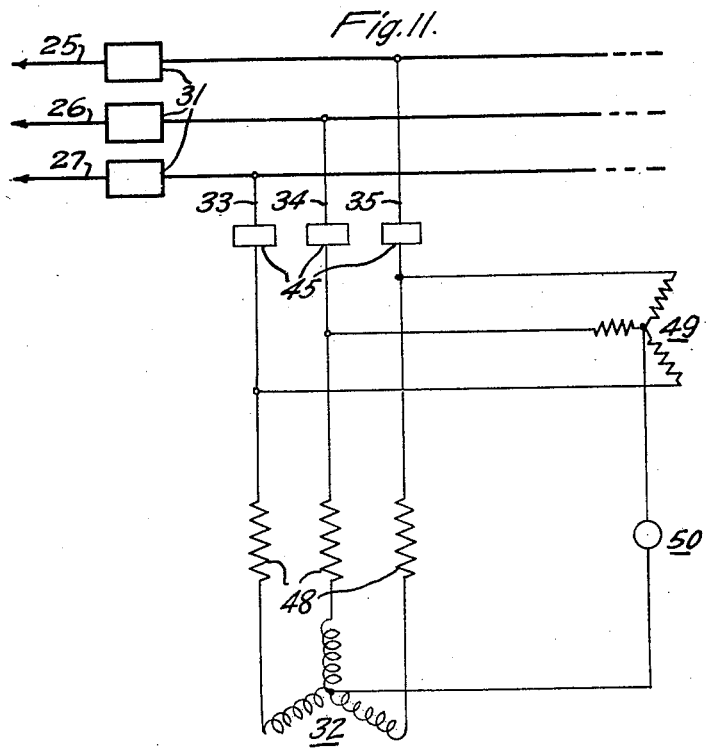

An arrangement for overcoming the effect of heavy line capacity currents is illustrated in Fig. 11. The three-phase protective generator 32 is connected to the line conductors 25, 26 and 27 through the conductors 33, 34 and 35 respectively. Suitable acceptor circuits 45 are connected in each of said conductors. A resistor or impedance device 48 is also connected in series with each of said conductors and a three-phase star-connected balanced resistor or impedance device 49 is connected in parallel with said conductors. The neutral points of the generator winding 32 and the balanced resistor 49 are connected through a relay 50. Under normal conditions equal currents flow from the protective generator into the line conductors through each of the conductors 33, 34 and 35 and therefore the neutral points of the generator 32 and the balanced resistor 49 are at the same potential. On the occurrence of a fault, the equality of potential drop across the resistor 48 is disturbed and hence the neutral points of the generator 32 and the balanced resistor 49 are no longer at the same potential and a current flows through the relay 50, which may be arranged to operate when said current reaches a predetermined value.

Where very long lines are to be protected as a whole, it is possible for stationary waves of the protective current frequency to be set up. Under these conditions one or more potential nodes might be formed, and if a fault occurs at or near one of these nodes the protective current flowing into the line might not be substantially affected.

In any of the modifications described, the protective relays may be inserted at any suitable point in the high-frequency circuits and not necessarily in the positions shown in the drawings. For instance, the protective current may be fed in at one end of a section and relays responsive to said protective current may be situated at the remote end of said section, said relays being associated with suitable circuits which will render them responsive only to the protective currents. In this case, the occurrence of a fault on the section will in general reduce the protective current flowing through said relays and so cause the operation of the necessary circuit-breakers.

Thus, in Fig. 10, the relays 46 and 47 at the same station as the high-frequency source 32 are over-current relays one or more of which will pick up upon the flow of a high-frequency current into any line fault, or line-to-line or line-to-ground short-circuit which may occur between the parallel-resonant blocking devices 31 and 44 at the two ends of the line sections. In the same figure, the relays 52 at the station remote from the high-frequency source 32 are under-voltage relays which close their contacts upon a drop in the high-frequency voltage which occurs when there is any kind of fault on the particular line-section inclosed by the aforesaid blocking devices 31 and 44. The two ends of a faulty line-section will thus be cleared instantaneously and simultaneously. It will be noted that the under-voltage relays 52 draw only a very small current from the high-frequency source, which is thus normally substantially open-circuited except upon the occurence of a fault, thereby minimizing inductive interference from the high-frequency source during normal clear-line conditions. It will be further noted that the blocking devices 31 and 44 confine the relay operation to faults occurring only within the one particular line section and prevent any relay operation in response to faults anywhere else.

It should be understood that the relays used in conjunction with this invention may be of any suitable form. The protective current generator may also be of any convenient form. It may, for instance, consist of an alternator driven by a motor. But in particular it may consist of a thermionic oscillation generator employing any desired circuit arrangement.

In general, in the foregoing specification and in the appended claims, when I refer to the relatively low frequency of the power system, without specifying that said power system is an alternating-current system, I mean to include zero-frequency systems, or direct-current systems, unless the context calls for a different interpretation.

The invention is not limited therefore to the particular arrangements herein described by way of example, its scope being indicated in the appended claims.

I claim:—

1. In a protective system for a power circuit including sectionalizing circuit breakers, the combination with a normally substantially unloaded source of control current of a frequency different from that of the power current, and filters continuously connected between said source and said circuit to continuously permit the flow of control current and to prevent the flow of power current, of filters in said power circuit for confining said control current to certain sections thereof without affecting the flow of power current, and relays responsive selectively to the control current flowing in the circuit, and responsive to changed conditions only when there is a short-circuit on the power circuit, for initiating the actuation of said circuit breakers.

2. In a protective apparatus, the combination with a power circuit provided with interrupting devices for isolating sections thereof and a main source of power therefor, of a normally substantially unloaded auxiliary source of current of frequency different from that of the main source continuously associated with one of said sections, means for confining the auxiliary current to said section, an acceptor circuit continuously connected between the power circuit and the auxiliary source for admitting auxiliary currents and for blocking power currents, and relays responsive only to the auxiliary current, and responsive to changed conditions only when there is a short-circuit on the power circuit, for initiating the actuation of the interrupting devices.

3. In a protective apparatus, the combination with a power circuit, a main source of power connected in series therein, a normally substantially unloaded auxiliary source of a different frequency continuously connected in parallel with the main source, and circuit interrupters for isolating portions of said circuit, of means for excluding power current from the auxiliary source, means connected in the power circuit excluding auxiliary current from the main source, and means responsive only to the auxiliary currents, and responsive to changed conditions only when there is a short-circuit on the power circuit, for initiating the actuation of the circuit interrupters.

4. In a protective apparatus for a power circuit including circuit breakers for isolating a faulty section thereof, an auxiliary source of a special control-frequency current, means for continuously superposing said current on said section, a local artificial dummy-line impedance-device energized from said auxiliary source, and a two-winding differential relay having its windings so connected as to be energized by the control-frequency current traversing said power circuit and the control-frequency current traversing said local circuit, respectively, for controlling the opening of a circuit breaker.

5. An electric power-transmitting line-section comprising a circuit breaker at each end of said line-section, characterized by means, including a normally substantially open-circuited source of high-frequency currents, for continuously superimposing said high-frequency currents on the power-line section, and means, including relays selectively responsive to said high-frequency currents, for substantially simultaneously and selectively initiating the tripping of both of said circuit breakers in response to all short-circuits occuring only on said line-section, said system including means for shielding the high-frequency currents in said line-section from deleterious effects due to transmission-line faults elsewhere than in said line-section.

6. A polyphase electric power-transmitting line-section comprising a circuit breaker at each end of said line-section, characterized by means, including a normally substantially open-circuited relay-circuit source of high-frequency currents, for continuously superimposing said high-frequency currents on the power-line section and responsive to short-circuit conditions therein, and means, including relays selectively responsive to said high-frequency currents, for substantially simultaneously and selectively initiating the tripping of both of said circuit breakers in response to all short-circuits occurring only on said line-section, said system including means for shielding the high-frequency currents in said line-section from deleterious effects due to transmission-line faults elsewhere than in said line-section.

7. A polyphase power line having two spaced stations, a plurality of line-conductors between said stations, a circuit breaker at each station, an auxiliary alternating-current source of a frequency different from the power-line frequency at one of said stations, means for continuously coupling said auxiliary source to all of said polyphase line-conductors in such manner as to substantially exclude the power currents from said auxiliary source, means in series with each line-conductor at each station for impeding the auxiliary-source currents more than the power currents, and fault-responsive relay means at each station for initiating the tripping of the appropriate circuit breaker at that station in response to the abnormal auxiliary-frequency circuit-conditions when additional auxiliary-frequency currents flow into a fault on said line between said two stations.

8. A polyphase power line having two spaced stations, a plurality of line-conductors between said stations, a circuit breaker at each station, an auxiliary polyphase source of a frequency different from the power-line frequency at one of said stations, means for continuously coupling said auxiliarly source to all of said polyphase line-conductors in such manner as to substantially exclude the power currents from said auxiliarly source, means in series with each line-conductor at each station for impeding the auxiliary-source currents more than the power currents, and fault-responsive relay means at each station for initiating the tripping of the appropriate circuit breaker at said station in response to the abnormal auxiliary-frequency circuit-conditions when additional auxiliary-frequency currents flow into a fault on said line between said two stations.

9. A polyphase power line having two spaced stations, a plurality of line-conductors between said stations, a circuit breaker at each station, an auxiliary grounded-neutral polyphase source of a frequency different from the power-line frequency at one of said stations, means for continuously coupling said auxiliary source to all of said polyphase line-conductors in such manner as to substantially exclude the power currents from said auxiliary source, means in series with each line-conductor at each station for impeding the auxiliary-source currents more than the power currents, and fault-responsive relay means at said station for initiating the tripping of the appropriate circuit breaker at said station in response to the abnormal auxiliary-frequency circuit-conditions when additional auxiliary-frequency currents flow into a fault on said line between said two stations, said last-mentioned means including auxiliary-frequency over-current relays in series with the phase and neutral connections of the auxiliary polyphase source.

10. A polyphase power line having two spaced stations, a plurality of line-conductors between said stations, a circuit breaker at each station, an auxiliary polyphase source of a frequency different from the power-line frequency at one of said stations, means for continuously coupling said auxiliary source to all of said polyphase line-conductors in such manner as to substantially exclude the power currents from said auxiliary source, means in series with each line-conductor at each station for impeding the auxiliary-source currents more than the power currents, over-current relay means coupled to the auxiliary-frequency output at the station containing said auxiliary-frequency source, connections for causing said over-current relay means to initiate the tripping of the appropriate circuit breaker at said station upon the flow of an auxiliary-frequency current in a line-fault between said stations, under-voltage relay means coupled to the line at the other station in such manner as to substantially exclude the power current, and connections for causing said under-voltage relay means to initiate the tripping of the appropriate circuit breaker at its station in the event of a short-circuit in its line-conductor.

11. An electric power-transmitting line-section comprising a circuit breaker at each end of said line-section, characterized by means, including a single normally substantially unloaded source of a special tripping-frequency current, for continuously superimposing said tripping-frequency current on said line-section, and means, including relays responsive to said tripping-frequency current for simultaneously and selectively initiating the acts of tripping both of said circuit breakers in response to short-circuits occurring only on said line-section.

12. An electric power-transmitting line-section comprising a circuit breaker at each end of said line-section, characterized by high-frequency means, including a single normally substantially unloaded source of a special tripping-frequency current, for continuously superimposing said tripping-frequency current on said line-section, and means, including relays responsive to said tripping-frequency current for simultaneously and selectively initiating the acts of tripping both of said circuit breakers in response to short-circuits occurring only on said line-section.

13. An electric power-transmitting line-section comprising a circuit breaker at each end of said line-section, characterized by high-frequency-responsive relays for tripping said circuit breakers, and means, including a normally substantially open-circuited high-frequency relay-circuit source responsive to short-circuit conditions, for continuously superposing a high-frequency relay-circuit current on the power currents in said line-section, tuned-circuit means associated with said line-section for causing said relays to actuate in response to predetermined high-frequency relay-circuit conditions, connections for causing said relays to substantially instantaneously intitiate the tripping of the appropriate circuit breakers at both ends of a faulty line-section in response to short-circuits occurring in said line-section, and means for substantially confining the high-frequency relay-circuit currents to said individual line-section and no other portions of the power-transmitting system, whereby said relay-circuit conditions materially change in response to the presence of a short-circuit somewhere within said line-section but not in response to short-circuits outside of the same.

14. An electric power-transmitting system comprising two spaced stations, line means between the same, circuit breakers at each of said stations, high-frequency-responsive relays for tripping said circuit breakers, and means, including a normally substantially open-circuited high-frequency relay-circuit source responsive to short-circuit conditions, for continuously superposing a high-frequency relay-circuit current on the power currents in said line means, tuned-circuit means associated with said line means for causing said relays to actuate in response to predetermined high-frequency relay-circuit conditions, connections for causing said relays to substantially instantaneously initiate the tripping of the appropriate circuit breakers at both ends of a faulty line-section in response to short-circuits occurring in said line-section, and means at each station for substantially blocking the passage of high-frequency relay-circuit currents, whereby said relay-circuit conditions materially change in response to the presence of a short-circuit somewhere within said line-section but not in response to short-circuits outside of the same.

15. An electric power-transmitting line-section comprising a circuit breaker at each end of said line-section, characterized by means, including a normally substantially open-circuited high-frequency relay-circuit source of high-frequency currents, for continuously superimposing said high-frequency currents on the power-line section and responsive to short-circuit conditions therein, high-frequency-current blocking-means inserted in the line-section at an end which is removed from said high-frequency source, under-voltage relay means coupled to the line at said end removed from said high-frequency source, in such manner as to substantially exclude the power current, and connections for causing said under-voltage relay means to initiate the tripping of the appropriate circuit breaker at its end of the line-section in the event of a short circuit in said line-section.

16. An electric power-transmitting system comprising two spaced stations, line means between the same, circuit breakers at each of said stations, high-frequency-responsive relays for triping said circuit breakers, and means, including a normally substantially open-circuited high-frequency relay-circuit source responsive to short-circuit conditions, for continuously superimposing a high-frequency relay-circuit current on the power currents in said line means, tuned-circuit means associated with said line means for causing said relays to actuate in response to predetermined high-frequency relay-circuit conditions, conections for causing said relays to substantially instantaneously initiate the tripping of the appropriate circuit breakers at both ends of a faulty line-section in response to short-circuits occurring in said line-section, and parallel-resonant means for substantially confining the high-frequency relay-circuit currents to said individual line-section and no other portions of the power-transmitting system, whereby said relay-circuit conditions materially change in response to the presence of a short-circuit somewhere within said line-section but not in response to short-circuits outside of the same.

17. An electric power-transmitting line-section comprising a circuit breaker at each end of said line-section, characterized by high-frequency-responsive relays for tripping said circuit breakers, and means, including a single normally substantially open-circuited high-frequency relay-circuit source responsive to short-circuit conditions, for continuously superimposing a high-frequency relay-circuit current on the power currents in said line-section, tuned-circuit means associated with said line-section for causing said relays to actuate in response to predetermined high-frequency relay-circuit conditions, connections for causing said relays to substantially instantaneously initiate the tripping of the appropriate circuit breakers at both ends of a faulty line-section in response to short-circuits occurring in said line-section, and parallel-resonant means for substantially confining the high-frequency relay-circuit currents to said individual line-section and no other portions of the power-transmitting system, whereby said relay-circuit conditions materially change in response to the presence of a short-circuit somewhere within said line-section but not in response to short-circuits outside of the same.

18. An electric power-transmitting line-section comprising a circuit breaker at each end of said line-section, characterized by high-frequency-responsive relays for tripping said circuit breakers, and means, including a single normally substantially open-circuited high-frequency relay-circuit source responsive to short-circuit conditions, for continuously superimposing a high-frequency relay-circuit current on the power currents in said line-section, tuned-circuit means associated with said line-section for causing said relays to actuate in response to predetermined high-frequency relay-circuit conditions, connections for causing said relays to substantially instantaneously initiate the tripping of the appropriate circuit breakers at both ends of a faulty line-section in response to short-circuits occurring only in said line-section.

19. An electric power-transmitting line-section comprising a circuit breaker at each end of said line-section, characterized by high-frequency-responsive relays for tripping said circuit-breakers, and means, including a single normally substantially open-circuited high-frequency source responsive to short-circuit conditions, for continuously superimposing a high-frequency relay-circuit current on the power currents in said line-section, and tuned-circuit means associated with said line-section for causing said relays to actuate in response to predetermined high-frequency relay-circuit conditions, connections for causing said relays to substantially instantaneously initiate the tripping of the appropriate circuit breakers at both ends of a faulty line-section in response to short-circuits occurring only in said line-section.

20. An alternating-current power line comprising circuit-interrupter means at spaced points for isolating a predetermined line-section in case of a fault therein, a single high-frequency means individual to said line-section for continuously superimposing an auxiliary high-frequency current on the power currents in said line-section and for causing the flow of a substantial high-frequency current therein only in the event of a short-circuit within that particular line-section, and means selectively responsive to the occurrence of said short-circuit high-frequency current flow condition to initiate the actuation of both of said circuit-interrupter means.

21. An alternating-current power line comprising circuit-interrupter means at spaced points for isolating a predetermined line-section in case of a fault therein, a single high-frequency means individual to said line-section for continuously superimposing an auxiliary high-frequency current on the power currents in said line-section and for causing the flow of a substantial high-frequency current therein in the event of a short-circuit within that particular line-section, anti-resonant blocking means for substantially confining said high-frequency current to that particular line-section, and means selectively responsive to the occurrence of said short-circuit high-frequency current flow condition to initiate the actuation of both of said circuit-interrupter means.

22. Protective apparatus for a power system having circuit breakers for isolating sections thereof, including a normally substantially unloaded auxiliary source of high-frequency control current continuously electrically associated with said system, filters connected between said source and said system for excluding system currents from the auxiliary source, filters at the ends of said sections for confining the auxiliary-source currents in the respective sections, and relays responsive selectively to the high-frequency currents traversing the various sections for initiating the actuation of the proper circuit breakers upon the flow of high-frequency current into a short-circuit in a section being protected.

23. Protective equipment for a power system having circuit breakers for isolating sections thereof, including a normally substantially unloaded auxiliary source of control current of a frequency different from that of the power current, means continuously interposed between said source and said system for offering a high impedance to the power frequency and substantially no impedance to the control frequency, means at the ends of said sections for offering a high impedance to the control frequency and substantially no impedance to the power frequency, and relays responsive selectively to the control current traversing the system, and responsive to abnormal control-current conditions only when there is a short-circuit on the power circuit, for initiating the actuation of said circuit breakers.

24. A protective system for a power circuit including circuit breakers for isolating sections of the circuit comprising a normally substantially unloaded auxiliary source of control current of a frequency other than that of the power current electrically associated with said power circuit, acceptor circuits continuously connected between said source and said circuit for excluding power-circuit currents from the auxiliary source, rejector circuits at the ends of said sections for confining the auxiliary-source currents in the respective sections, and means responsive selectively to the control current flowing into a fault on the power circuit between said rejector circuits for initiating the actuation of said circuit breakers.

In testimony whereof, I have hereunto subscribed my name this 17th day of March 1925.

WALTER JOHN BROWN.